US009293927B2

(12) United States Patent
Soar

(10) Patent No.: US 9,293,927 B2
(45) Date of Patent: *Mar. 22, 2016

(54) INDUCTIVELY COUPLED POWER AND DATA TRANSMISSION SYSTEM

(75) Inventor: Roger J. Soar, Kelowna (CA)

(73) Assignee: Cynetic Designs Ltd., Kelowna, British Columbia (CA)

( * ) Notice: Subject to any disclaimer, the term of this patent is extended or adjusted under 35 U.S.C. 154(b) by 563 days.

This patent is subject to a terminal disclaimer.

(21) Appl. No.: 13/502,045

(22) PCT Filed: Oct. 13, 2010

(86) PCT No.: PCT/CA2010/001638
§ 371 (c)(1),
(2), (4) Date: Apr. 13, 2012

(87) PCT Pub. No.: WO2011/044695
PCT Pub. Date: Apr. 21, 2011

(65) Prior Publication Data
US 2012/0206097 A1    Aug. 16, 2012

Related U.S. Application Data

(63) Continuation-in-part of application No. 11/922,788, filed on Dec. 21, 2007, now Pat. No. 7,863,859, and a continuation-in-part of application No. 12/923,594, filed on Sep. 29, 2010, now Pat. No. 8,791,600.

(60) Provisional application No. 61/272,621, filed on Oct. 13, 2009.

(51) Int. Cl.
H02J 7/00    (2006.01)
H02J 5/00    (2006.01)
(Continued)

(52) U.S. Cl.
CPC . *H02J 5/005* (2013.01); *F41G 1/34* (2013.01); *F41G 3/165* (2013.01); *F41H 1/00* (2013.01);
(Continued)

(58) Field of Classification Search
USPC .......... 363/132, 144; 361/735, 760, 761, 762, 361/763, 764, 790
See application file for complete search history.

(56) References Cited

U.S. PATENT DOCUMENTS 5,264,776 A   11/1993  Hulsey
5,550,452 A   8/1996   Shirai et al.
(Continued)

FOREIGN PATENT DOCUMENTS

EP    1610439    12/2005
WO    0016493    4/2000

OTHER PUBLICATIONS

U.S. Appl. No. 12/923,895 Soar, Inductive Coupled Power and Data Transmission System, Feb. 10, 2011.*

*Primary Examiner* — Yalkew Fantu
(74) *Attorney, Agent, or Firm* — Anthony C. Edwards

(57) ABSTRACT

An inductively coupled power and data transmission system include a main power source, apparel having an electrical conductor in electrical communication with the main power source, the apparel having a first inductively couplable power and data transmission sub-system to regulate power to the primary coil or coils and transmission of power and data by the primary coil or coils and reception of data by the primary coil or coils, and an independent device having a second inductively couplable power and data transmission sub-system so as to regulate reception of power and data by the secondary coil or coils and transmission of data from a secondary processor by the secondary coil or coils. The first and second primary coils transfer said power and data during inductive coupling, at electromagnetic radiation frequencies, between the first primary coil or coils and the secondary coil or coils.

24 Claims, 12 Drawing Sheets

(51) Int. Cl.
  *F41G 1/34* (2006.01)
  *F41H 1/00* (2006.01)
  *H02J 7/02* (2006.01)
  *H04B 5/00* (2006.01)
  *H04K 3/00* (2006.01)
  *F41G 3/16* (2006.01)

(52) U.S. Cl.
  CPC .............. *H02J 7/025* (2013.01); *H04B 5/0031* (2013.01); *H04B 5/0037* (2013.01); *H04B 5/0087* (2013.01); *H04K 3/25* (2013.01); *H04K 3/827* (2013.01); *Y10T 307/625* (2015.04)

(56) References Cited

U.S. PATENT DOCUMENTS

| | | |
|---|---|---|
| 5,959,433 A | 9/1999 | Rohde |
| 6,301,128 B1 | 10/2001 | Jang et al. |
| 6,356,052 B2 | 3/2002 | Koike |
| 6,388,422 B1 | 5/2002 | Lew |
| 6,424,820 B1 | 7/2002 | Burdick et al. |
| 6,476,581 B2 | 11/2002 | Lew |
| 6,490,176 B2 | 12/2002 | Holzer et al. |
| 6,657,351 B2 | 12/2003 | Chen et al. |
| 6,906,495 B2 | 6/2005 | Cheng et al. |
| 6,960,968 B2 | 11/2005 | Odendall et al. |
| 7,076,206 B2 | 7/2006 | Elferich et al. |
| 7,149,552 B2 | 12/2006 | Lair |
| 7,254,366 B2 | 8/2007 | Palermo et al. |
| 7,462,951 B1 | 12/2008 | Baarman |
| 7,612,528 B2 | 11/2009 | Baarman et al. |
| 7,657,255 B2 | 2/2010 | Abel et al. |
| 7,681,788 B2 | 3/2010 | Van de Velde et al. |
| 7,728,551 B2 | 6/2010 | Reed et al. |
| 7,797,248 B1 | 9/2010 | Bierbaum et al. |
| 2002/0154518 A1 | 10/2002 | Elferich et al. |
| 2004/0080922 A1* | 4/2004 | Aoyagi .................. 361/793 |
| 2004/0145343 A1 | 7/2004 | Naskali et al. |
| 2004/0189246 A1 | 9/2004 | Bulai et al. |
| 2004/0232845 A1 | 11/2004 | Baarman et al. |
| 2005/0017958 A1 | 1/2005 | Silverbrook et al. |
| 2005/0127866 A1 | 6/2005 | Hamilton et al. |
| 2006/0087282 A1 | 4/2006 | Baarman et al. |
| 2006/0224048 A1 | 10/2006 | Devaul et al. |
| 2007/0171681 A1 | 7/2007 | Baarman |
| 2008/0129215 A1 | 6/2008 | Boys |
| 2009/0218884 A1 | 9/2009 | Soar |

* cited by examiner

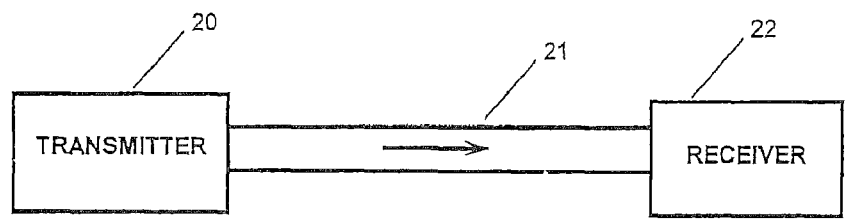
CONDUCTIVE
Fig. 1a
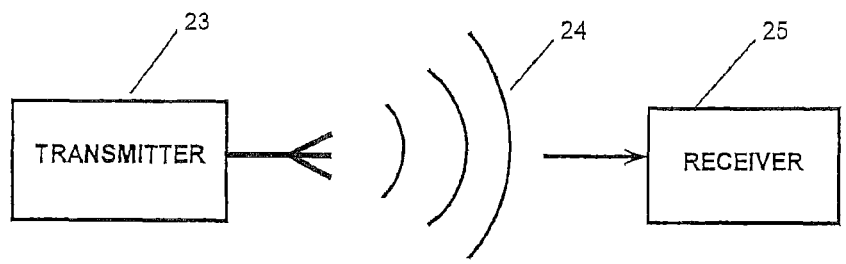
RADIATIVE
Fig. 1b
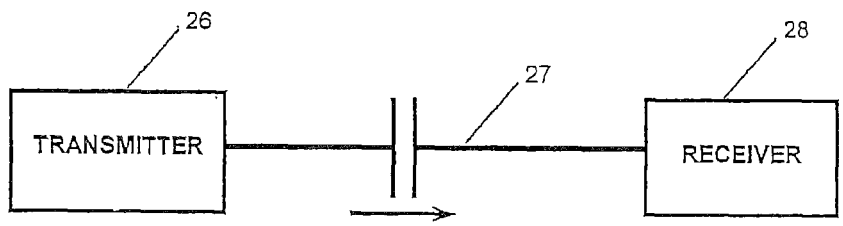
CAPACITIVE
Fig. 1c
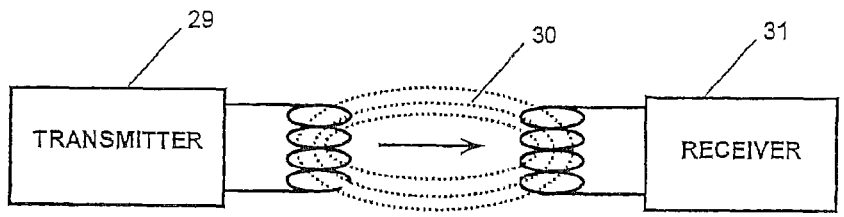
INDUCTIVE
Fig. 1d
PRIOR ART
Fig. 1

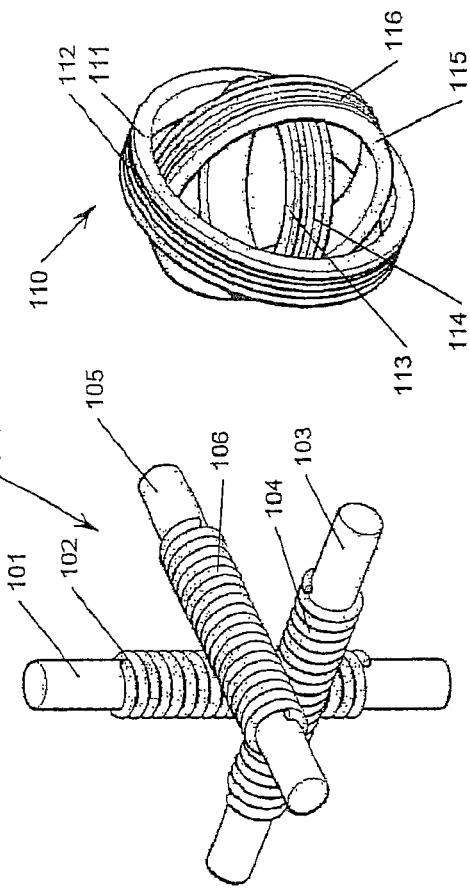
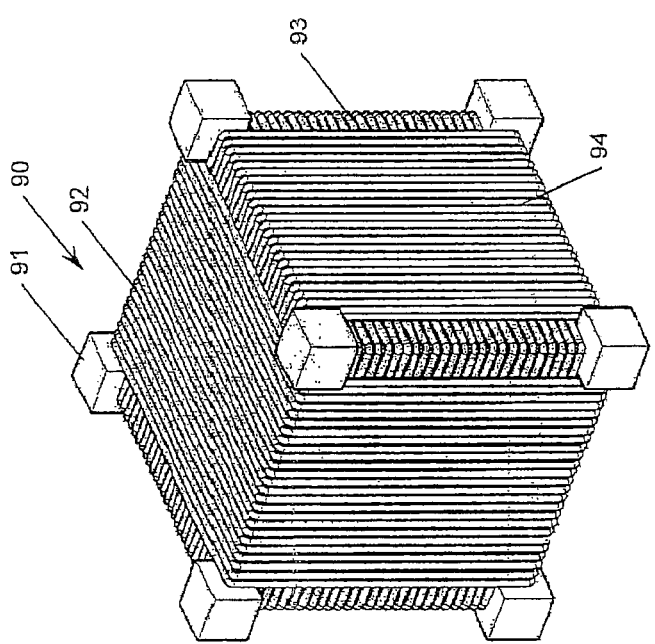

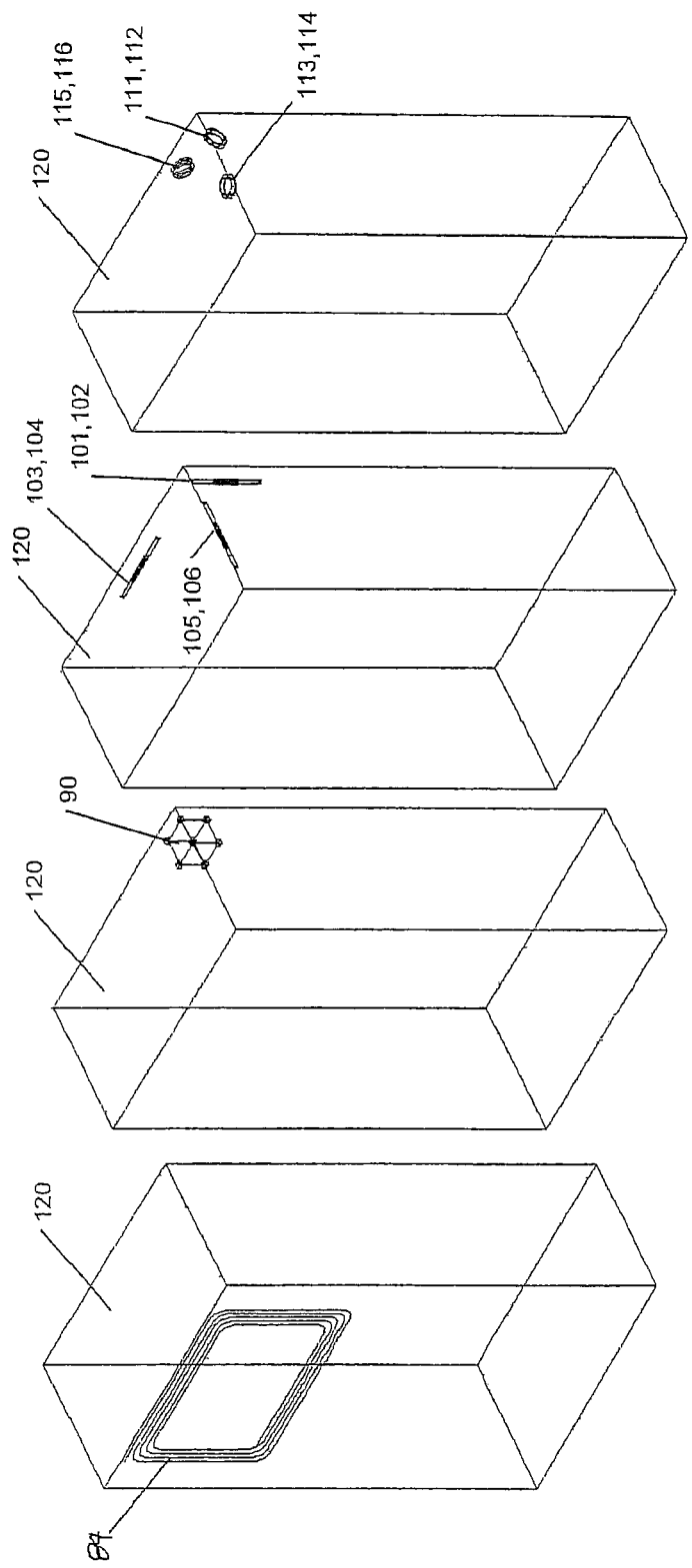

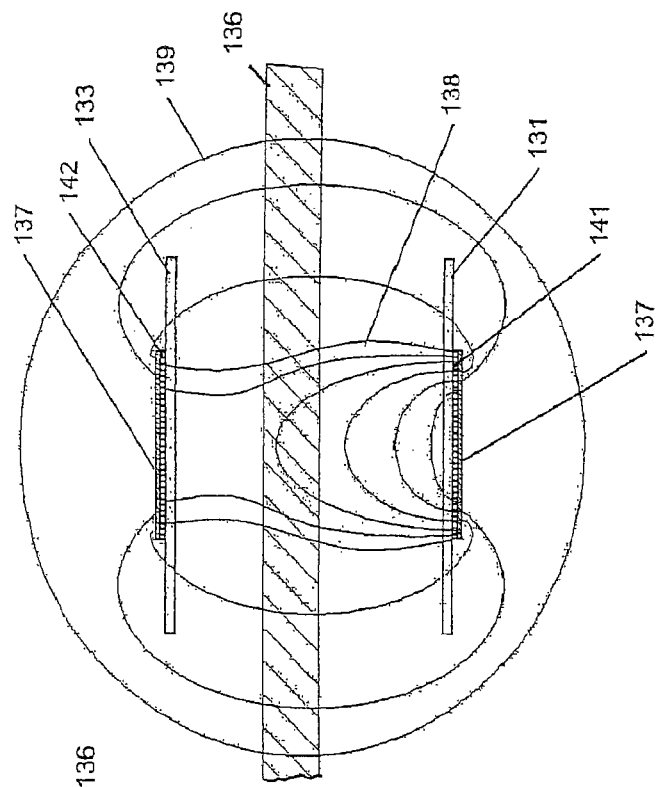
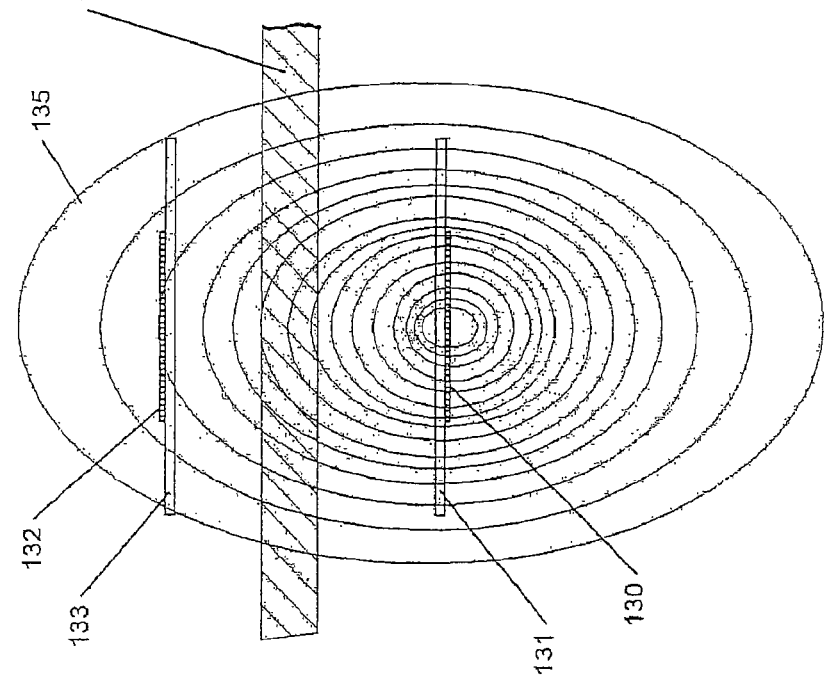
Fig. 8b
Fig. 8a

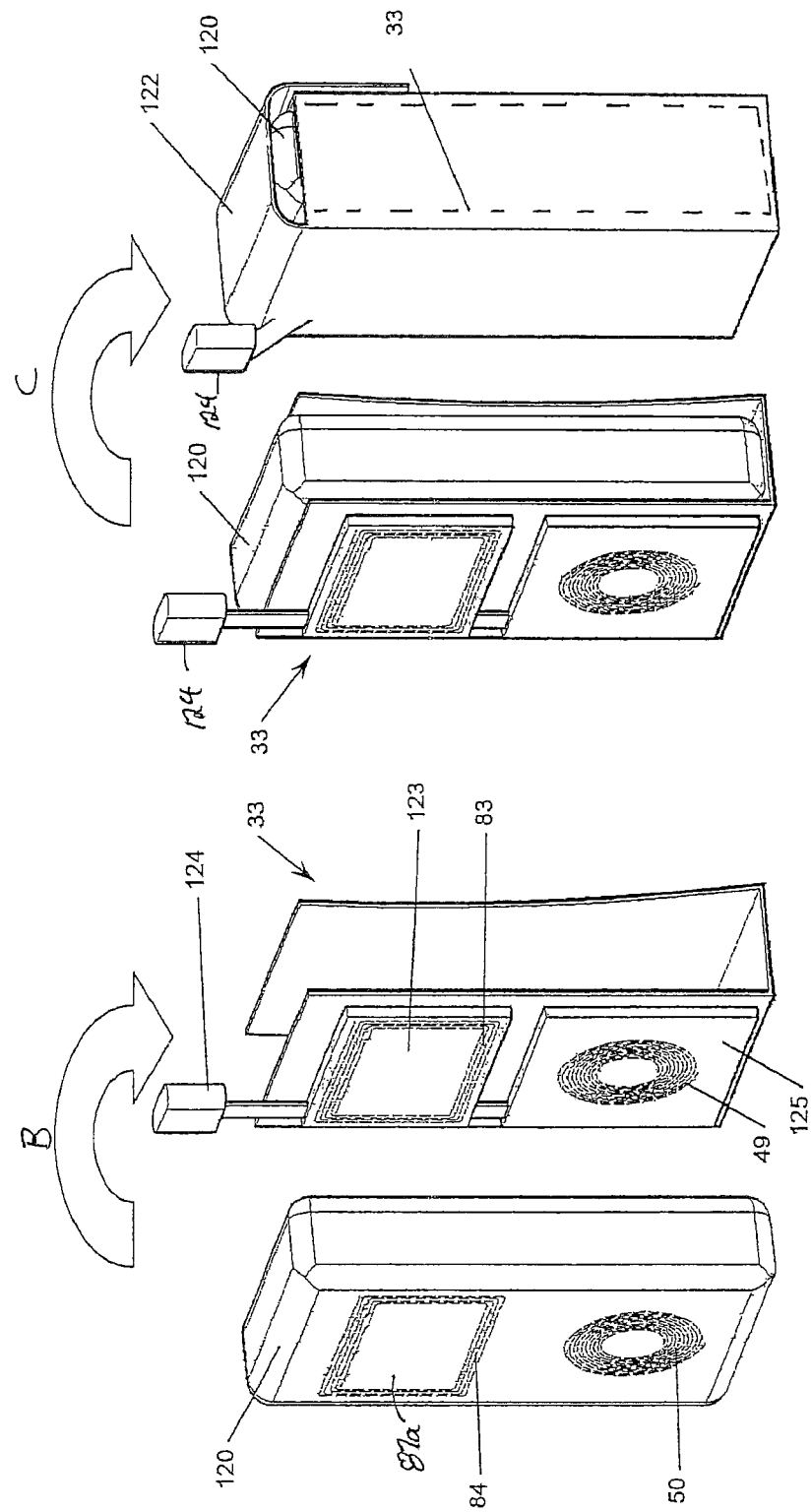

INDUCTIVELY COUPLED POWER AND DATA TRANSMISSION SYSTEM

CROSS REFERENCE TO RELATED APPLICATION

This application is a continuation-in-part from my U.S. patent application Ser. No. 11/922,788 entitled Contactless Battery Charging Apparel and from United States continuation-in-part patent application filed Sep. 29, 2010 entitled Vehicle Seat Inductive Charger And Data Transmitter. This application claims priority from U.S. Provisional Patent Application No. 61/272,621 filed Oct. 13, 2009 entitled Soldier System Wireless Data Transmission.

FIELD OF THE INVENTION

This invention relates to the field of wireless devices using magnetic inductive coupling and in particular to a wireless power and data transmission system for use in a soldier system.

BACKGROUND OF THE INVENTION

With the development of future soldier systems by many countries there has been a significant increase in the number of electronic devices that are being carried by soldiers. Some of these devices are stand alone and do not require communication to operate. Devices such as flashlight, laser aiming device or laser dazzler etc. need only be provided with battery power to function. Other devices including various video displays such as GPS, heads up displays, PDA type displays; or input devices such as a computer mouse or pointing device, keyboard; input-output devices such as microphone headsets, all require the use of cables to communicate with a central computer or between themselves. In some cases these devices may also draw power from the communications cable.

All of these devices require complex cable and wiring harnesses which are heavy, thick and stiff terminated with a variety of connectors, and that as a system create a myriad of human factor and mechanical issues when loads such as packs are placed over them. Individual wires are frequently subject to failure within the wiring harness as well as the documented high failure rate of connectors. In addition, the weapon sub system and helmet subsystem support many electronic devices which must communicate with and in some cases receive power from the torso. Cables which run between the weapon and helmet and the soldiers torso are typically called umbilicals or tethers. These cables can be very limiting, frequently catching or snagging on anything from doorknobs to vehicle attachments and corners as well as branches in the forest. When the cables snag they can either harm the soldier as his forward movement is suddenly stopped; restrain him so he cannot obtain cover from fire, or the cable is violently pulled from its socket frequently causing damage to either end of the connector or the cable itself even when the connector is of a quick release design.

As taught to us by recent events, soldiers in present and future wars and police and domestic agencies controlling riots or hostage type situations employ Radio Frequency (RF) jamming devices to prevent the activation and use of various radio devices. In domestic applications this may be the use of cellular phones that would be used for verbal communication or as a triggering device for an explosive. In military applications the RF jammer can be used to protect individual soldiers, but more typically is used to protect individual vehicles or convoys of vehicles in areas that have been laid with Improvised Explosive Devices (IED's) that are detonated remotely by radio frequency by a variety of simple transmitters.

It is also now common place to employ wide area high power or local area low power portable RF jamming equipment to deny the use of RF equipment by opposing forces. The RF jammers protect soldiers within different areas of a protective bubble from the RF detonation of road side bombs or IED's, however it also eliminates the use of low power RF communications such as Bluetooth™, Zigbee™ or WiFi etc. Jammers work in all types of environments. Threats from RF IED attacks are not just limited to desert warfare, but may also occur in shopping malls, office buildings, airports, bus stations, and other urban targets.

The modern soldier has a wealth of radio equipment that is critical for inter and intra squad communication as well as between the squad and forward operating bases and rear command centers. This entire radio network is used for voice, data, still video image and streaming video data image transmission in both directions as either information being communicated out of the battle zone or command and control information being directed into the battle area. Collectively this capability is known as C4I or command, control, communications, computers, and (military) intelligence and also as C4ISR command, control, communications, computers, intelligence, surveillance, and reconnaissance.

A method of, and apparatus for, providing a data communications capability on a soldier system in a RF denied area that is wireless, and which is not susceptible to radio frequency jamming, and cannot be intercepted at distance employs the transmission of data magnetically through inductive coupling. It is proposed herein that both power and data be transmitted inductively on the soldier. Not only would this allow the transfer of power and data without wires, tethers or umbilicals to the various devices of the soldier, but more importantly it would allow the local transmission of data on the soldier that cannot then be intercepted or in an area that has been denied RF communication either because of enemy, allied or self generated RF jamming.

I hereby incorporate by reference my U.S. patent application Ser. No. 11/922,788 (Publication No. 20090218884) entitled "Contactless Battery Charging Apparel". The application describes sequential power transmission between a central power source carried on a soldier or person that is distributed through a wiring harness or conductive fabric worn on the soldier to inductive nodes located at various locations on torso of the soldier. The inductive power transfer nodes allow the transfer of power to rechargeable batteries in electronic devices distributed on the soldier without having physical contact or wires between the soldier and the components. The inductively coupled primary and secondary coils allow the transfer of power based on air core transformer theory.

Open platform inductive Near Field Communications (NFC) architecture is known. Prior art related to on-body inductive or near field communication however focuses on two applications. Both the patent to Palermo (U.S. Pat. No. 7,254,366 B2) entitled "Inductive Communication System and Method" and the patent to Lair (U.S. Pat. No. 7,149,552 B2) entitled "Wireless Headset for Communications Device" employ inductive near field communications to provide inductive coupling between hand held radios and a microphone/speaker or headsets.

A patent application by Devaul (US Patent Application Publication No. 2006/0224048 A1) entitled "Wearable Personal Area Data Network" describes the application of NFC to allow the communication between a master node or hub and remote node physiological sensors mounted on the body. The data communicated wirelessly from the sensors is analysed by the master node to determine the health status or mobility of the wearer. One application of the technology identified is placement of the system on a soldier to allow remote interrogation of a soldier on the battlefield to determine his health status and allow for earlier combat casualty care if so indicated. A patent application by Dinn (US Patent Application 2008/0227390 A1) entitled "Method and System for Relaying Signals from a Magneto-Inductive System Through a Voice Band System", describes a man-portable station that can communicate through earth or rock using magneto-inductive transfer. The system enables secure low baud rate data and voice communications for users separated by line of sight obstacles located underground, underwater, or in dense urban environments. Vehicle-mounted systems are capable of providing secure communications over longer ranges. The operating frequency is between 300 Hz to 3 kHz and requires an antenna of at least 3 m in diameter laid on the ground. The device is commercially available under the Trade Mark "Rock Phone". None of the prior art envision the application of NFC to provide wireless communication within a soldier system as described within this patent application.

When data is to be transferred from one electronic device to another or between a source and a receiver, there are four basic coupling methods that can be used. The basic arrangement of source, coupling path and receiver is shown in FIG. 1, where source and receiver are electronic hardware devices.

The four basic coupling mechanisms are: conductive, radiative, capacitive, and magnetic or inductive. Any coupling path may be broken down into one or more of these coupling mechanisms working together. Conductive coupling occurs when the coupling path between the source or transmitter 20 and receiver 22 is formed by direct contact with a conductor 21, for example a wire, cable, electronic textile (power and data backplane), or PCB trace. Radiative coupling or electromagnetic coupling occurs when the source or transmitter 23 and receiver 25 are separated by a large distance, typically more than a wavelength. The source radiates via an antenna an electromagnetic wave 24 which propagates across an open space and is picked up by the receiver. Radiative coupling is used by radios, wireless modems, Bluetooth™, Zigbee™ enabled devices etc. Inductive coupling occurs where the source or transmitter 29 and receiver 31 are separated by a short distance, that is within the near field of the transmission frequency. Inductive coupling can be of two kinds, electrical induction and magnetic induction. It is common to refer to electrical induction as capacitive coupling, and to magnetic induction as inductive coupling. Capacitive coupling between a transmitter 26 and receiver 28 occurs when a varying electrical field exists between two adjacent conductors 27 typically located within the near field, inducing a change in voltage across the gap. Inductive coupling or magnetic coupling occurs when a varying magnetic field 30 exists between two adjacent conductors usually coils, located within the near field, inducing a change in voltage in the receiving conductor or coil.

Inductive or magnetic coupling has been used in Radio Frequency Identification Devices (RFID's). At the basic level in an RFID an interrogator or primary circuit generates an alternating magnetic field that inductively couples with a transponder. The transponder or secondary circuit can be passive whereby it derives electrical energy from the magnetic coupling allowing it to transmit simple modulated data streams or it can be an active transponder. An active transponder has its own battery power source allowing it to both transmit back inductively to the interrogator a larger modulated data stream over a greater distance. There are two basic frequency ranges used by inductively coupled RFID devices, low frequency principally operates between 100-500 khz, and high frequency operates at a center frequency of 13.56 Mhz.

SUMMARY

In summary, the inductively coupled power and data transmissions system for a soldier system according to the present invention may be characterized as including in one aspect:
  a) a main power source adapted for portable wearing by a soldier,
  b) apparel having an electrical conductor mounted therein in electrical communication with the main power source, the apparel having a first inductively couplable power and data transmission sub-system including at least one electrically conductive primary coil electrically connected to the main power source by the electrical conductor, and further including a primary processor and a primary transmitter/receiver sub-system cooperating between the main power source and the primary coil or coils so as to regulate power to the primary coil or coils and transmission of power and data by the primary coil or coils and reception of data by the primary coil or coils,
  c) an independent device having a second inductively couplable power and data transmission sub-system including at least one electronically conductive secondary coil, a secondary battery, a secondary processor, and a secondary transmitter/receiver sub-system, wherein the secondary coil or coils are electrically connected to its or their secondary battery and wherein the secondary processor and the secondary transmitter/receiver sub-system cooperate between the corresponding secondary battery and the corresponding secondary coil or coils so as to regulate reception of power and data by the secondary coil or coils and transmission of data from the secondary processor by the secondary coil or coils.

The first and second primary coils are adapted to transfer said power and data during inductive coupling, at electromagnetic radiation frequencies, between the first primary coil or coils and the secondary coil or coils. The power is transferred when the inductive coupling is closely adjacent inductive coupling, wherein the primary and secondary coils are closely adjacent to each other, and wherein a data link for the transfer of the data is established when the primary and secondary coils are closely adjacent inductively coupled, and wherein the data transferred between the primary and secondary coils when the inductive coupling is between the closely adjacent inductive coupling and near inductive coupling, wherein the near inductive coupling is constrained by factors including the wavelength of electromagnetic radiation in the inductive coupling when the wavelength is used in the formula lamda/(2×pi) to determine an outer range limit of the near inductive coupling, as attenuated by attenuation of the radiation and power levels of the power transfer.

The primary coils may be mounted on the apparel in positions chosen from the group including but not limited to: torso, collar, shoulder, wrist, helmet front surface. The secondary coils may be advantageously mounted on the independent devices so as to optimize their closely adjacent inductive coupling and their near inductive coupling of the secondary coils to their corresponding primary coils when in aforesaid positions.

In one embodiment instead of a single primary coil matched for coupling to a single secondary coil, each include a pair of coils. Thus one of the coils in each pair of coils is adapted for transfer of only power and the other coil in each pair of coils is adapted for transfer of only data.

In embodiments where the power levels are sub-watt, the range limit of the near inductive coupling is substantially one meter. The close inductive coupling may be substantially in the range of approximately 0-3 centimeters.

Within each pair of coils on the primary side, and within each pair of coils on the secondary side, one coil then will be a data transfer coil and the other a power transfer coil) In such embodiments the primary processor may be adapted to: (a) shut-off power from the main power source to the at least one primary coil when the data transfer indicates that the secondary battery is charged or the at least one secondary coil is not in position for the closely adjacent inductive coupling as may be determined by a proximity sensor for example, or by polling, and, (b) continuously continue the transfer of the data between the at least one primary and secondary coils until the range limit of the near inductive coupling is exceeded and the near inductive coupling between any one of the at least one primary coil and a corresponding secondary coil, upon detection, for example by the proximity sensor or by polling of a corresponding closely adjacent inductive coupling between the two.

A plurality of primary coils may be distributed about the apparel. A plurality of secondary coils may then be provided on a corresponding number of the independent devices, wherein the independent devices are adapted to dock for closely adjacent inductive coupling with their corresponding primary coils. The closely adjacent inductive coupling for said docking of the independent devices may include docking in pockets on the apparel, wherein at least one primary coil is mounted in the pocket. The pockets may be modular, and may include inserts in which the primary coils are mounted.

The independent devices may be chosen from the group of categories comprising: torso sub-systems which include sectioned pieces of apparel and layered separate pieces of apparel, helmet sub-systems, weapon sub-systems.

The transfer of the data may include a networked transfer of data between a plurality of said independent devices.

BRIEF DESCRIPTION OF THE DRAWINGS

In the following drawings similar reference numerals denote corresponding parts in each view in which;

FIG. 1 is a diagram of the four electromagnetic prior art coupling modes for data communications, and in particular FIG. 1a represents the conductive electromagnetic coupling mode, FIG. 1b represents the radiative coupling mode, FIG. 1c represents the capacitive coupling mode, and FIG. 1d represents the inductive coupling mode.

FIG. 6a is a representation of a three axis or orthogonal three dimensional cubic design inductive coil with a solid ferrite cubic core.

FIG. 6b is a representation of three axis or orthogonal coils wrapped around corresponding ferrite rods.

FIG. 6c is a representation of three axis orthogonal circular coils wrapped around corresponding ferrite rings.

FIG. 7a represents a simple air-backed air core coil mounted on hand held device which is shown in outline in perspective view.

FIG. 7b is the hand held device of FIG. 7a illustrating an example of a three-dimensional cubic antenna.

FIG. 7c is the hand held device of FIG. 7a showing the use of a 3D ferrite rod antenna where the rods have been separated.

FIG. 7d is the hand held device of FIG. 7a showing three spherical three element 3D antennas which have been separated.

FIG. 8a is a simplified representation of the magnetic flux lines around linear sections of primary and secondary inductive coils, and in particular illustrates an energized air-backed lower coil radiating magnetic flux symmetrically around it and thus showing how the upper secondary coil intercepts only a small amount of the magnetic field.

FIG. 8b is also a simplified illustration of the magnetic flux lines around linear sections of primary, lower, and secondary, upper, inductive coils placed in close proximity, showing the use of a thin ferrite backing behind the coils and illustrating how the magnetic flux is increasingly directional so that the ferrite backing of the secondary coil enhances the concentration of magnetic flux passing through the coil.

FIG. 10a is, in exploded view, a hand held device having secondary coils inductively couple with corresponding primary coils on a pocket insert when the hand held device is contained within the insert.

FIG. 10b illustrates the combination of hand held device and pocket insert of FIG. 10a, once assembled, and the combination inserted into a garment pocket.

DETAILED DESCRIPTION OF EMBODIMENTS OF THE INVENTION

Figure 2:
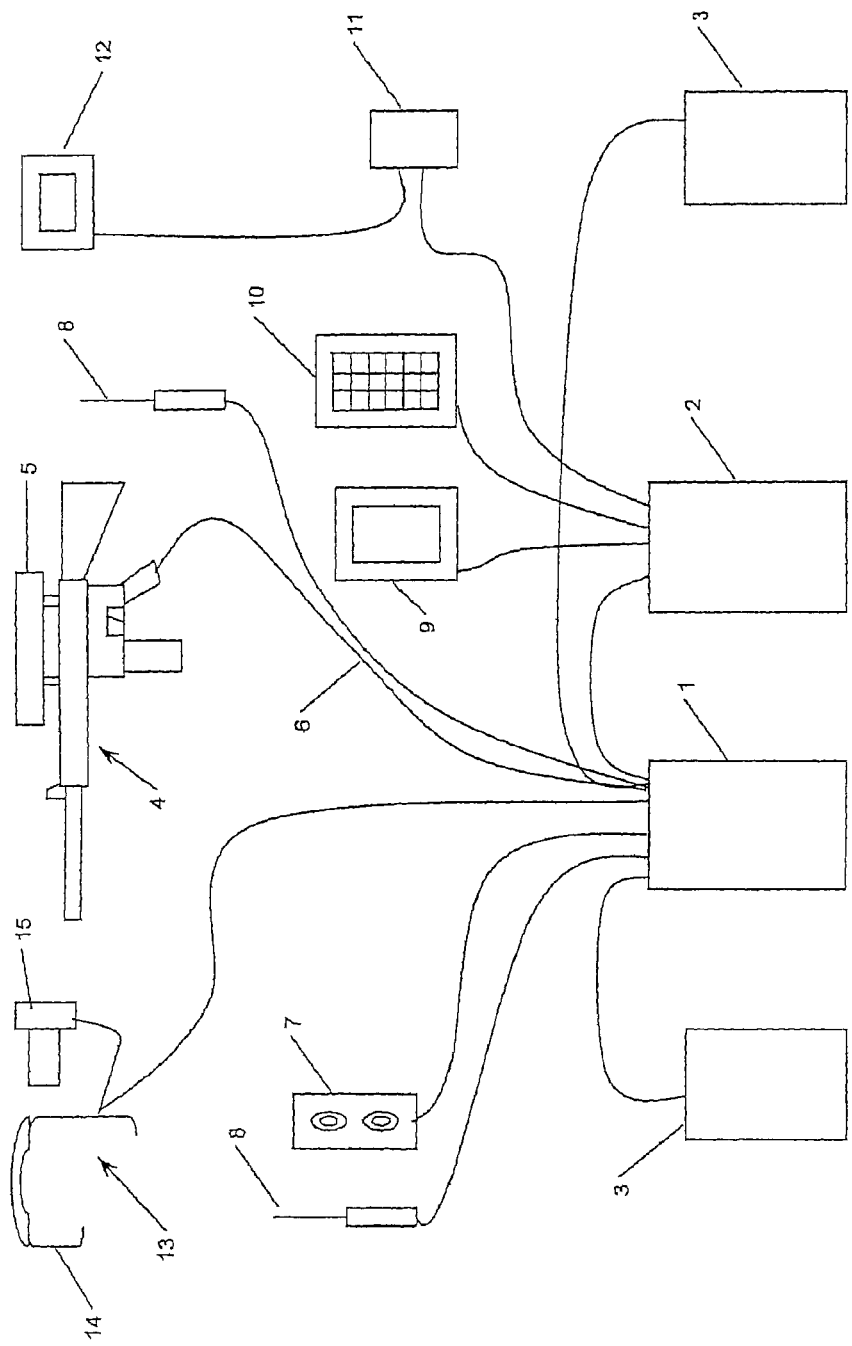
FIG. 2 diagrammatically illustrates the interconnection of components used in the United States Army Land Warrior system showing the twelve cables required to join the components.

The modern soldier of today as exemplified by soldier systems fielded such as Land Warrior (US), IDz (Germany), Felin (France) and others may consist as seen diagrammatically in FIG. 2 of a central computing device, or CPU 1, perhaps including an enhanced computer sub-system 2, connected by electrical cables 6 to distributed devices such as radios 8, GPS 12, weapon subsystem 4, electronic sighting system 5, input or pointing device 7, keyboard 10, inertial navigation 11, helmet subsystem 13, enhanced noise reduction equipment 14, night vision viewer 15, and soldier battlefield data terminal and tactical displays 9, and in some systems a central power supply that is a rechargeable high capacity battery 3. The wiring harness of cables 6 that provides all necessary data and power interconnects between the distributed equipment is typically constructed from cables that 0.25" in diameter. The cables are stiff so the internal wires do not bend easily and fatigue. Consequently the wires are inflexible. They frequently meet at large over-molded junctions. The cables are terminated with substantial military specification connectors that are long and bulky. The cables must convey power and data between devices carried on the torso hand-held devices and to those mounted on the helmet and weapon sub-systems (collectively referred to herein as independent devices) through cables usually referred to as umbilicals or tethers. The stiff cables for hand held devices that are stowed on the torso make manipulation of the devices very difficult and place stresses on the interconnection points. In addition the routing of cables through and under garments create significant overall discomfort especially when a load such as a pack is placed over them. The cable passing to the weapon and the helmet is known to constantly cause snags, unintentional disconnects and are a general nuisance to the soldier. In total, the Land Warrior system requires twelve interconnection cables.

Figure 3:
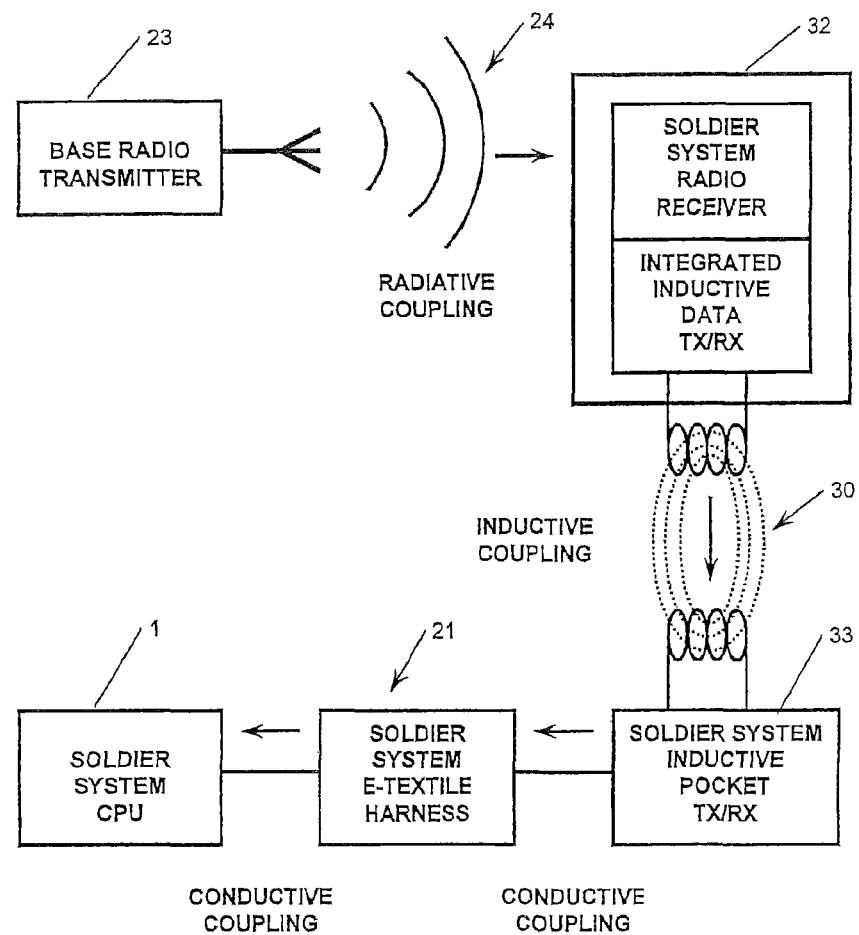
FIG. 3 is a diagrammatic view showing an example of the combined paths electromagnetic coupling modes that may be found on a soldier system data transmission.

Future soldier systems must address the shortcomings of existing systems to provide higher levels of usability and general associated human factors. Technologies that have been identified to accomplish this undertaking are the use of e-textiles such as that manufactured by Intelligent Textiles, UK, that provides a fabric thin, supple backplane layer within a load carriage or tactical vest that provides power and data connectivity for the soldier system. To eliminate the wires that run to handheld devices and the weapon and helmet subsystems, I have identified that power may be transmitted wirelessly using inductive power transfer and describe herein that data may also be transmitted inductively, providing a system without umbilical, tethers or external wires connecting devices. Thus as seen in FIG. 3, base radio transmitter 23 is coupled to soldier system radio receiver and integrated inductive data transmitter/receiver 32 by radiative coupling. The integrated inductive data transmitter/receiver is inductively coupled with soldier system inductive pocket transmitter/receiver 33, which, as described below, is merely one example of where and how the inductive coupling to the subsystems may be accomplished. Inductive pocket transmitter/receiver 33 is conductively coupled to soldier system e-textile harness 21, again, as set out below, which is just another example of a conductive coupling device which may be used. E-textile harness 21 is conductively coupled to soldier system CPU 1.

For a soldier system, magnetic flux inductive data transmission offers the advantage that it can perform short range data exchange without a wired or physical connection. Inductive coupling has excellent material penetration capabilities. It can penetrate non-magnetic materials such as air, water, body tissue, fabric, soft armour panels, and plastic. As no exposed electrical contacts are required for inductive data transfer or inductive power charging, the primary side of the inductive circuits located on the soldier can be fully encapsulated and environmentally ruggedized. As the secondary side device circuit is contained within the target independent device, the independent device can now be semi-permanently sealed and ruggedized as frequent data cable coupling and battery replacement is not required. This enables the inductive power and data transfer enabled devices be full submersed in water, and be impervious to exposure to ice, snow, mud, dust, dirt, sand, etc as well as battlefield petroleum, oils and lubricants (POL's).

Low power, sub-watt design inductive coupled devices have a limited communication range for example in the order of one meter. For-on body soldier system applications this is advantageous as it provides the capability for limited or fixed range communication while limiting the possibility of interception of the communication interference from other independent devices on the soldier system. This is important when inductive data transmission is used in a soldier system which has sensitivity to power consumption and especially when inductive transmission is compared to a wired connection which consumes no power.

For low-frequency applications analog tools and building blocks can be used. Circuits can use existing electronic components and IC's. For example, low-cost transceiver can be implemented by adding a resonant tank (LC) to a microcontroller with a PWM and comparator. Using a minimum of components and a single frequency band, the inductive data transfer components are able to support half duplex bidirectional communication.

As discussed in my U.S. patent application Ser. No. 11/922,788 and published under publication No. 20090218884, it is possible to power a data device using inductive power transfer. This when combined with inductive data transfer provides very useful wireless connectivity for a soldiers electronic devices within a soldier system.

The propagating medium plays a major role in the performance of the inductive communications link. It should be stressed that magnetic field behaviour is not the same as for electromagnetic waves normally associated with RF communications. Electromagnetic waves propagate for long distances in free space. The RF electromagnetic wave is, however, susceptible to scattering and distortion. Magnetic field lines, however, are less prone to distortion and known to penetrate water and nonconductive, non magnetic materials very well. A magnetic field attenuates more rapidly when compared to an electromagnetic wave, which is a benefit for a soldier system versus when using conventional radio technology such as Bluetooth™, Zigbee™ or other short range RF technologies. These low power RF devices can be intercepted using high power receivers and directional antennas at over a kilometer in distance and as such are not a communication technology preferred by the military.

Inductive transmit and receive coils may be thought of as a weakly-coupled transformer, across which data may be transmitted by modulating the source (or transmitter) and detecting the modulated signal at the receiver. Typical frequencies in the low frequency range for the inductively coupled data transmission are between 100-500 kHz and can be used for low baud data rate of up to 9.6 kbps, and in the high frequency range 13.56 MHz is used when high baud rate data transmission of up to 424 kbps are required. The US Army has identified required data rates of between 9.6 Kbps for physiological status monitors to 256 Kbps for weapon ballistics computation. Baud rates of greater than 80 Kbps second are required if low resolution streaming video is to be supported, with a baud rate of 256 Kbps for full streaming video. It has been determined that high quality audio transmissions can be made with data rates of 30-40 kpbs.

An inductive data communication system that uses the 13.56 MHz frequency range is allowed by national and international communication regulatory agencies such as the FAA or in Europe the European Conference of Postal and Telecommunications Administrations (CEPT) that have set aside specific frequency ranges for applications such as industrial, scientific or medical applications (ISM), for very short range devices.

In designing a magnetically coupled data transfer system, one has the choice of implementing any one of a large variety of modulation and encoding formats. Typical modulation methods may use, but are not limited to ASK (Amplitude Shift Keying) or other standard formats and iterations such as FSK (Frequency Shift Keying), OOK (On-Off Keying), PSK (Phase Shift Keying) and DPK (Differential Phase Shift Keyed) etcetera.

Encoding of the data stream could also be performed by many existing methods including but not limited too Manchester, Miller, PIE and their variants, etcetera.

Drive Circuitry

One of the most efficient methods to drive an inductive resonant tank circuit is a drive circuit that employs either a Full or Half-Bridge switching technology. One gets good results with a half bridge, and it has the advantage of being low cost. The use of a serial resonant tank circuits and high Q serial resonant circuit may have advantages.

One circuit design example is where a device such as a microprocessor sends data encoded for serial transmission to a data driver transistor that turns on and off very rapidly and by so doing modulates the coil voltage across the tuned LC circuit. The modulated signal is transmitted by the primary side coil across the loosely coupled inductive link to the secondary coil where it generates an AC signal that is rectified and decoded back to serial data. Example simplified block schematics are provided in FIGS. 4 and 5.

Figure 4:
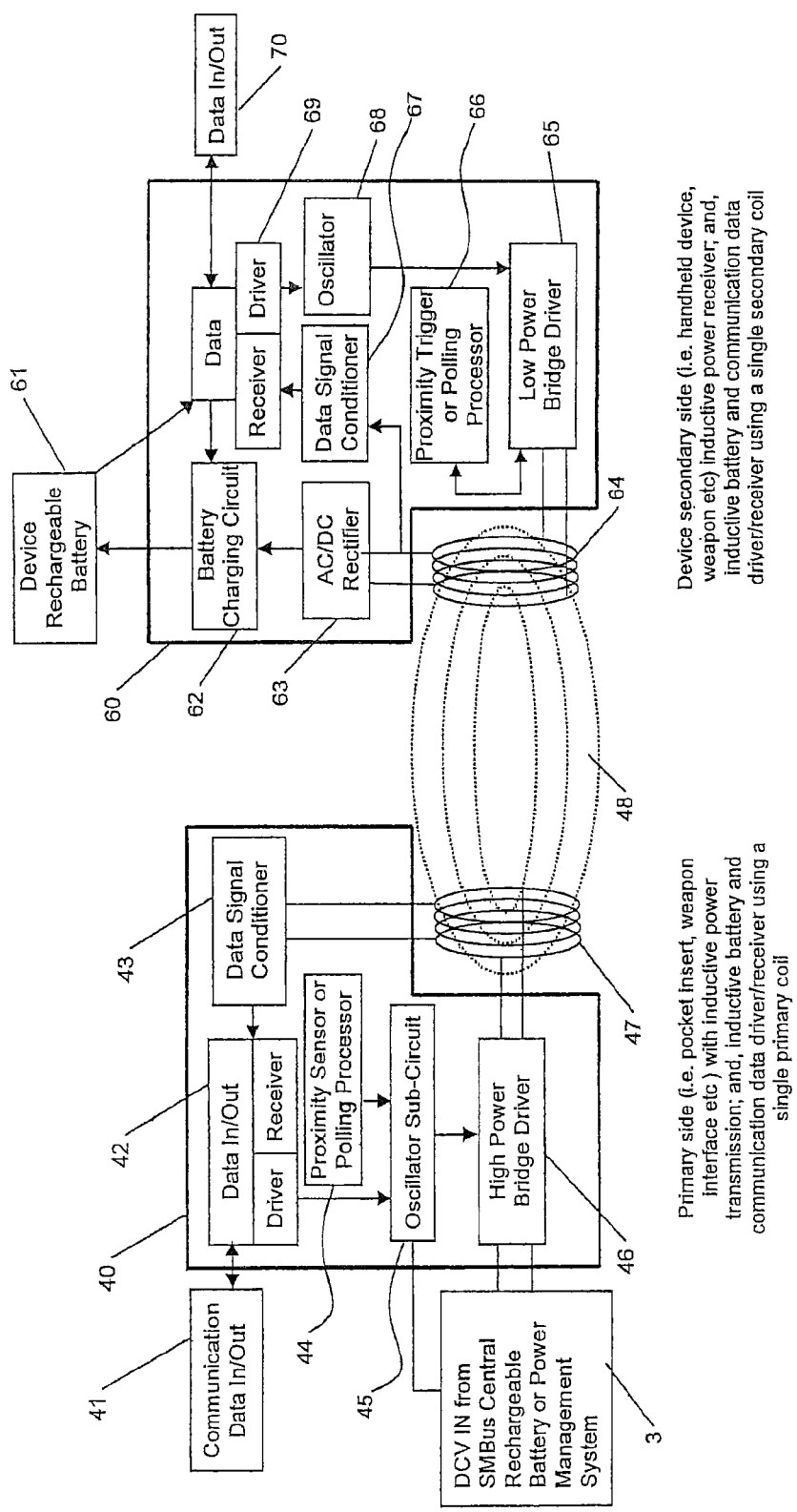
FIG. 4 is a simplified schematic block diagram showing inductive power and data transfer using a single coil on each of the primary and secondary sides.

FIG. 4 illustrates a schematic block diagram where power and data is transferred inductively using only a single primary coil and corresponding single secondary coil, being coils 47 and 64 respectively. In FIG. 4, a primary side is to the left of the magnetic flux lines 48 and secondary side is to the right of the magnetic flux lines. Magnetic flux lines 48 illustrate the inductive coupling across the air gap between the primary and secondary coils. On the primary side, a DC power source 3 provides power to both a power bridge driver 46 and tank circuit oscillator sub-circuit 45. Proximity sensor or polling processor 44 cooperates with oscillator sub-circuit 45 so that the oscillator sub-circuit 45 is only enabled when the secondary side is in proximity whether detected by a proximity sensor or by polling intermittently via oscillator sub-circuit 45. With oscillator sub-circuit 45 enabled, high power bridge driver 46 drives coil 47 so as to inductively couple with the secondary coil 64 across magnetic flux 48. When it is desired to transmit data, the transfer of power is discontinued or disabled and the communication data in/out port 41 provides data in and out of primary data processor driver/receiver 42. The data driver cooperates with oscillator sub-circuit 45 to thereby modulate primary coil 47 for the sending of data to the secondary side. As also part of the primary inductive power and data drive circuit 40, a primary side data signal conditioner 43 cooperates between primary coil 47 and primary data processor driver/receiver 42.

On the secondary side, as part of the secondary inductive power and data circuit 60, the AC signal received by secondary coil 64 via magnetic flux 48, is rectified within AC/DC rectification sub-circuit 63. Rectification circuit 63 cooperates with battery charging sub-circuit 62 which in turn provides charging to device rechargeable battery 61. Battery 14 provides power to the secondary side data processor receiver/driver 69. Secondary side data processor receiver/driver 69 cooperates with battery charging circuit 62, the receiver side of receiver/driver 69 cooperating with secondary side data signal conditioner 67, and the driver side of receiver/driver 69 cooperating with data signal oscillator 68. Data signal conditioner 67 cooperates with secondary coil 64. Oscillator 68 cooperates with low power bridge driver 65. Proximity trigger or, if employed, for example, a polling processor in place of the proximity trigger, collectively referred to by reference numeral 66, cooperates with low power bridge driver 65. Data from data processor receiver/driver 69 is transferred in and out of secondary inductive power and data circuit 60 via data in/out 70.

Figure 5:
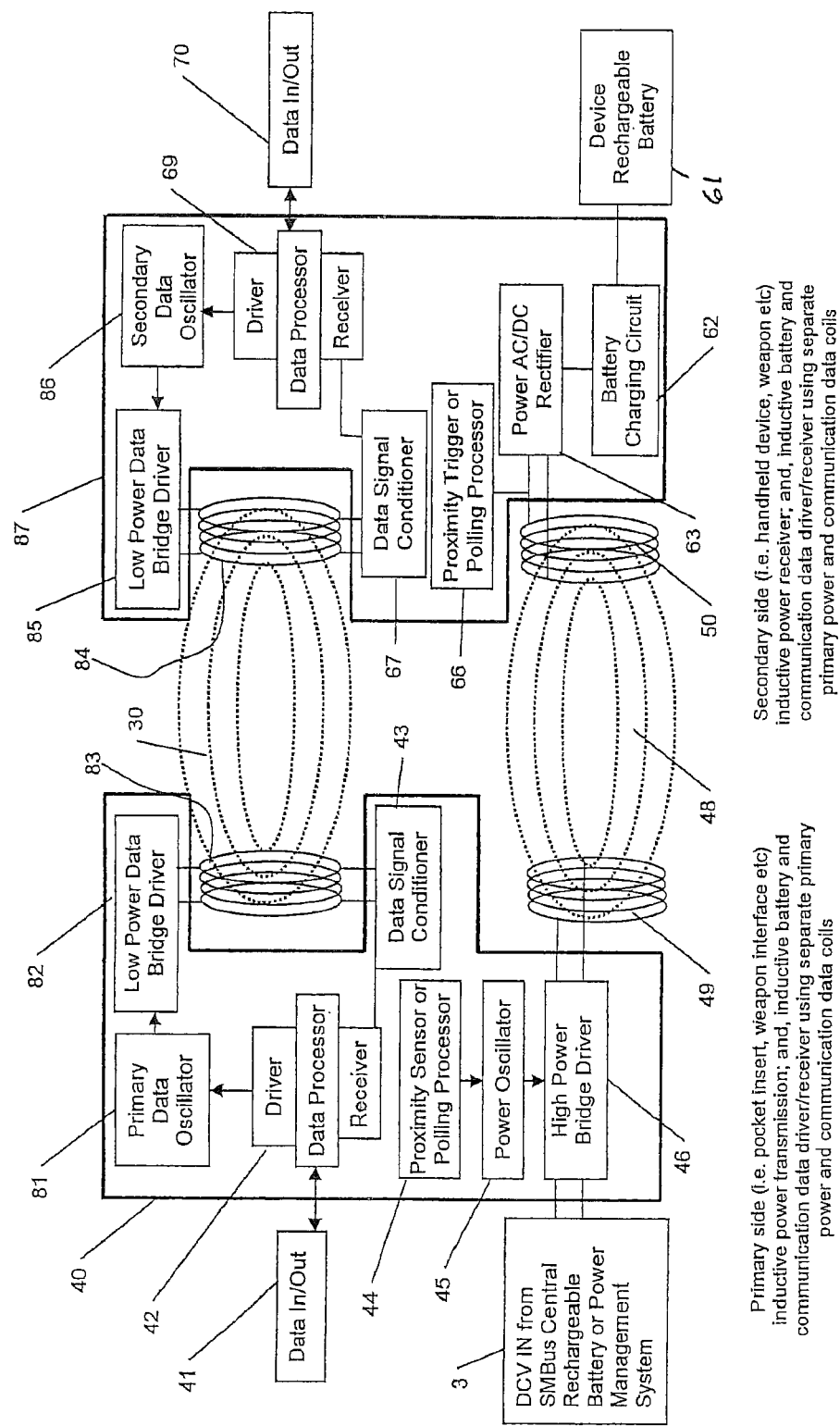
FIG. 5 is a simplified schematic block diagram showing inductive power and data transfer using separate coils on each of the primary and secondary sides.

FIG. 5 illustrates a schematic block diagram wherein the inductive transfer of power and data is accomplished using separate primary and secondary coil pairs. Although the power transfer coils and data transfer coils are illustrated as being physically separate, that is, non-concentric, it is understood that this is not intended to be limiting in that the power transfer coils and data transfer coils may be concentric and adjacent, concentric and embedded, concentric and layered one behind the other, or interleaved and having adjacent ferrite backings to name just a few examples.

Thus as seen in FIG. 5, as already described in respect of FIG. 4, power is transferred from primary coil 49 to secondary coil 50 across magnetic flux 48. A power source 3 from SMBus central rechargeable battery 3 or power management system provides power for a high power bridge driver 46 which provides power to primary coil 49. In the embodiment employing either proximity sensing or polling to detect the presence of secondary coil 50, a proximity sensor 44, for example, a hall sensor using the so-called hall effect for proximity sensing of the secondary side or a polling processor as described above, cooperates with a tank circuit oscillator sub-circuit 45 which in turn cooperates with high power bridge driver 46. On the secondary side of the power transfer, AC rectification sub-circuit 63 cooperates with secondary coil 50, and provides a rectified voltage to battery charging circuit 62. Again, as described above, battery charging circuit 62 supplies power to recharge device rechargeable battery 61, battery 61 providing power for soldier carried electronic devices such as those described above which include, and are intended to be limiting, weapons subsystem 4, electronic sighting system 5, input or pointing device 7, radio or radios 8, battle field tactical display 9, keyboard 10, inertial navigation 11, GPS navigation 12, helmet subsystem 13, noise reduction device or circuitry 14, night vision viewer 15, all of which cooperating with central processing unit 1 and enhanced computer subsystems 2. Thus in the diagrammatic view of the data transmission in a soldier system of FIG. 3, the primary side of the inductive coupling may include coils 47 or 83, and the secondary side may include coils 64 or 84.

Returning now to FIG. 5, for the data processing and transfer, data is transferred into and out of the primary inductive drive circuit via communication data in/out 41 which cooperates with primary data processor driver/receiver 42. The driver side cooperates with a primary data oscillator 81 which in turn cooperates with a primary low power data bridge driver 82 which itself cooperates with the primary data communications coil 83. The receiver side of data processor 42 cooperates with data signal conditioner 43 which in turn cooperates with primary data communications coil 83. Data is transferred via magnetic flux 30 across the air gap over which magnetic flux 30 extends, between primary data communications coil 83 and the corresponding secondary data communications coil 84. On the secondary side, within the secondary inductive power and data circuit 87, secondary data communications coil 84 cooperates with both low power data bridge driver 85 and with data signal conditioner 67. Data signal conditioner 67 cooperates with the receiver side of data processor driver/receiver 69. The driver side cooperates with secondary data oscillator 86, which in turn cooperates with low power data bridge driver 85. Secondary side data processor driver/receiver 69 cooperates with data in/out 70 so as to transfer data back and forth between data processor 69 and the soldier carried electronic devices, for example, those of independent devices FIG. 2, referred to by reference numerals 1-15, or those of Table 1.

The coil or antenna configuration for the transfer of the magnetic energy can take many forms. For example, as described above in respect of FIG. 4, a single coil used for inductive power transfer may also be modulated to provide data transfer. This may only transfer low level data such as distributed battery power levels and simple text requirements, although this is not intended to be limiting. As described in respect of FIG. 5, two coils on each of the primary and secondary side of the inductively coupled circuit may be employed for both power and data transmission. On the primary side of the inductive circuit one coil would provide power transmission and the other data transmission to their mating coils on the secondary side. This technique allows power for charging of batteries to be turned on and off independently of data transmission. The data transmission may thus for example always be on. The power transfer coils could be used for inductive power transfer at frequency at for example 150 kHz while the data transfer coils operating at frequency of for example 13.56 MHz could be used for inductive data transfer. By using appropriate filtering neither of the frequencies would interfere with the other. This would also allow each of the power and data circuits to be optimised for each function.

The primary and secondary inductive coils or antennas can be produced in many different materials for example but not limited too being wire wound using conventional enamelled copper magnet wire, or multi-filament Litz wire, coil designs etched into single, double sided or multi-layer printed circuit boards, single double sided or milt-layer flexible substrates such as Mylar™, Kapton™, polyamides, polyesters etc can be of any geometric shape.

Coil geometry for either the primary or secondary inductive data coil may be a three-dimensional (3D) coils such as seen in FIGS. 6a-6c so that conditions are optimised for signal reception between the primary and secondary coils when they are not aligned in parallel. In particular, in FIG. 6a, three-dimensional coil 90 includes z-axis cubic antenna windings 92, x-axis cubic antenna windings 93, and y-axis cubic antenna windings 94. In FIG. 6b, y-axis cylindrical antenna windings 102 are wound on y-axis ferrite rod 101, z-axis cylindrical antenna windings 104 are wound on z-axis ferrite rod 103, and x-axis cylindrical antenna windings 106 are wound on x-axis ferrite rod 105. In FIG. 6c, the spherical 3D coils 110 include z-axis circular antenna windings 112 wound z-axis ferrite ring 111, x-axis circular antenna windings 114 wound on x-axis ferrite ring 113, and y-axis circular antenna windings 116 wound on y-axis ferrite ring 115. Due to the many locations on the torso that a hand held or data device may be located and the variations in the size and shape of the independent devices themselves, the transmit and receive antennas for either the primary or secondary inductive data circuits would be placed and aligned to optimize their function and coupling distance when for example the data is being transferred when the hand held device is remote from its primary side. The antenna may be planar (2D), 2.5 dimensional or a three dimensional orthogonal antenna, and be constructed from any of the multitude of rigid or conformal antenna technologies available including air backed, ferrite backed, ferrite rod and ferrite core. The limit of the range of the inductive communications becomes a function of the transmitted power, antenna diameter or configuration and the Q factor of the coupled antennas. FIGS. 7a-7d illustrates various secondary coils or antennas positioned in a generic handheld device 120. As may be seen, and without intending to be limiting, there are a large variety of antenna types and installation options. FIG. 7a shows a simple air backed air core coil. FIG. 7b includes an example of a 3D cubic antenna. FIG. 7c shows a 3D ferrite rod antenna 100 where the rods have been separated from the cluster configuration of FIG. 6b to three separate elements on each of the three orthogonal axis. FIG. 7d illustrates spherical three element 3D antenna 110 where the rings and circular windings have been split into each of the three elements.

For the purpose of the following discussions the primary inductive data circuit is defined as the data processing circuit that is located on the soldier and the secondary inductive data circuit is located in the independent device. It should be understood that in practise the primary circuit when transmitting data is often understood to be the initiating circuit and the secondary or receiving circuit is the target circuit. The respective roles of the circuits may then change as the secondary circuit in the independent device may, depending on its function, now transmit data back to the primary circuit located on the soldier. The devices and the docking unit may communicate in half duplex.

Inductive data transfer as with inductive power transfer also employs vicinity inductive coupling within near field or more specifically the radian sphere. The magnetic flux of a typical inductive data circuit with a central operating frequency of 13.56 MHz has a wavelength of 22 m. Inductive coupling for practical data transmission purposes occurs no further than the near field-far field transition or radian sphere which is approximately defined as $\lambda/2\pi$ (lambda/(2×pi)) or for 13.56 MHz a theoretical maximum range of 3.5 m. In practise, because of the very low power levels utilised and because the magnetic field attenuates at a rate following the inverse cube law, a practical low power independent handheld device 120 has a range limit of about one meter. This is considerably unlike inductive power transfer requirements which to be reasonably efficient are in close proximity typically (less than 1-2 cm), with power levels of 1-5 watts for handheld devices. It is understood that the proximity estimates for data transfer (one meter) and for power transfer (1-2 cm) are not intended to limit, as with optimization of antenna design, location, sensitivity of the transmitter/receiver circuits, etc, those distances may upon further development be increased.

One method of creating an inductive data link is to utilise NFC technology which uses an inductive link to enable connectivity between devices. NFC technology is an open architecture technology based on the ECMA 340 and 352 connectivity standards. ECMA 340 specifies a magnetic induction interface operating at 13.56 MHz and with data rates of 106, 212, 424 kbps and if required 848 kbps or higher.

Although envisioned primarily for future soldiers, other applications could be land-mine and bomb technicians where inductive communications would allow communication to occur even when RF jamming is being used to prevent detonation of those explosive devices. Tactical Police and Special forces would be able to use inductive communications either when RF jamming is being used and if radio silence where to be used so that intercepts could not take place. These and other first responders are referred to collectively herein as soldiers.

Data transfer is not just limited to between a soldier and the equipment the soldier is carrying. It could also take place anywhere inductive power transfer is required such as between a soldier and a vehicle or between a pilot and aircraft seat, at which time data could also be transferred inductively.

Another application would see the install of multiple coils on the perimeter of a vehicle for example an exterior horizontal perimeter. The vehicle would inductively couple with soldiers or other nearby vehicles or aircraft without physical contact and would allow communications to occur during RF jamming events. This would allow soldiers to both depart and approach vehicles and remain in communication with the vehicle crew, when if dependent solely on RF communications they would otherwise not be able to communicate. The inductive communication would work over a range of 0-25 m and would be very difficult to intercept at distances of more than 25 meters. Again, these distances are estimates and not intended to be limiting.

A significant requirement for inductive data transfer would be that it not interfere with conventional military or civilian radio transmitters and receivers. Again because the inductive coupling is operating in the electro-magnetic frequency spectrum it would not cause any interference with devices operating in RF spectrum.

As discussed earlier, capacitive coupling could also be used for wireless or non contact data transmission on a soldier system. As discussed above, capacitive coupling is the transmission of electromagnetic energy from one circuit to another through mutual capacitance and is similar in overall effect to that of mutual inductive coupling. One key difference between inductive and capacitive coupling is that capacitive coupling favours the transfer of higher-frequency signal components, while inductive favours lower frequency elements.

Overall Power and Data Transmission Configuration

When using an inductively coupled device for the future soldier, both power and data as required can be provided without wires or RF signals between the primary node on the solider and the secondary node on a device or subsystem. Some designs may dictate that the communications of entire subsystems may be integrated and power and data be sent over a single node. This could be applied for example to the weapons subsystem or helmet subsystem both of which have multiple devices requiring power and data.

Conversely, power and data primary and secondary coils can be entirely separate systems.

Typical independent devices representative of those carried by a soldier that would use inductive power and inductive data transfer are presented in Table 1, broken down by Torso, Weapon, and Helmet sub-system categories. As used herein, the term independent device is also intended to include other items of apparel, that is, second pieces of apparel which are overlaid onto or under so as to be layered with the garment or apparel having the primary coils and circuitry.

In one embodiment the NFC system would be operated in active communication mode, versus passive, where both the primary (initiator) and the secondary (target) communicate with the other by alternately generating their own inductive data field in what is effectively a peer-to-peer mode of operation. A significant operational feature of NFC is that it removes the need for user intervention to establish pairing between devices. Two enabled NFC devices connect and perform a handshake routine that allows data exchange simply by being brought close enough together. Its application for data transfer between a soldier and electronic independent devices that the soldier is carrying (for example, the three sub-system categories of Table 1) have not to the applicant's knowledge been previously envisioned, whereby the soldier connects a device requiring communications simply by placing it within proximity of a primary side data circuit/coil and thereby rapidly establishes a data connection between the primary and secondary data circuits.

Once the two devices enabled with NFC technology have been brought within close proximity, usually a few centimeters, they automatically pair, and then with appropriate antenna circuits, as would be known to one skilled in the art, can be separated by for example 1 m as discussed above for continued communication. In practise, when an independent hand-held device 120 is placed within or near to its corresponding carrying pocket 122 mounted on an outer garment 150, such as a load carriage vest or protective ballistic vest, the primary and secondary data circuits handshake and form a data communications link "A" (illustrated by way of example in FIG. 12). The soldier may then take the device 120, such as the PDA device of FIG. 12, out of the pocket 122 and use it as a handheld device with practical separation distances of for example up to 1 m without breaking the inductive data communications link A. This is typically far greater than the distance afforded a soldier when he must use a handheld device that is hard wired via a cable and connector to a communications data stream from a prior art torso mounted soldier system. In addition the soldier can move the wireless device around quickly. With a wired device care must be taken when removing a handheld device from a pocket so that the cable is not separated from the device or that the connection is stressed. With the military requirement for cables being one of ruggedness, in practice this is difficult to do as the cable is stiff and heavy, while the connector is bulky.

Consider having to remove a wired handheld device from a pocket without being able to physically disconnect so as to not lose the data stream. The wired device must be removed from the pocket, which may have several flaps to allow the device and cable to be extricated. Care must be taken so the cable can be withdrawn from the vest without straining the connection. The cable may have insufficient length to let the wired device be used in a comfortable position. To stow the wired device the cable must usually be threaded back into the vest until the wired device can be returned to the pocket, after which the multiple flaps must be secured. Now consider having to conduct this operation while under fire, with gloved hands, while moving through bush or foliage that can snag or entangle the cable to the wired device and while also carrying a weapon. The considerable advantage of inductive data communication is that after a device 120 is paired with a pocket 122 it can be quickly and efficiently removed from the pocket with a simple closure, data can be obtained, received or transmitted, and then device 120 may be returned to pocket. The present improvement to the soldier system may thus reduce the damage to device 120 as compared to the use of a wired device, and may reduce bad communications and may reduce distraction for the soldier.

Figure 12:
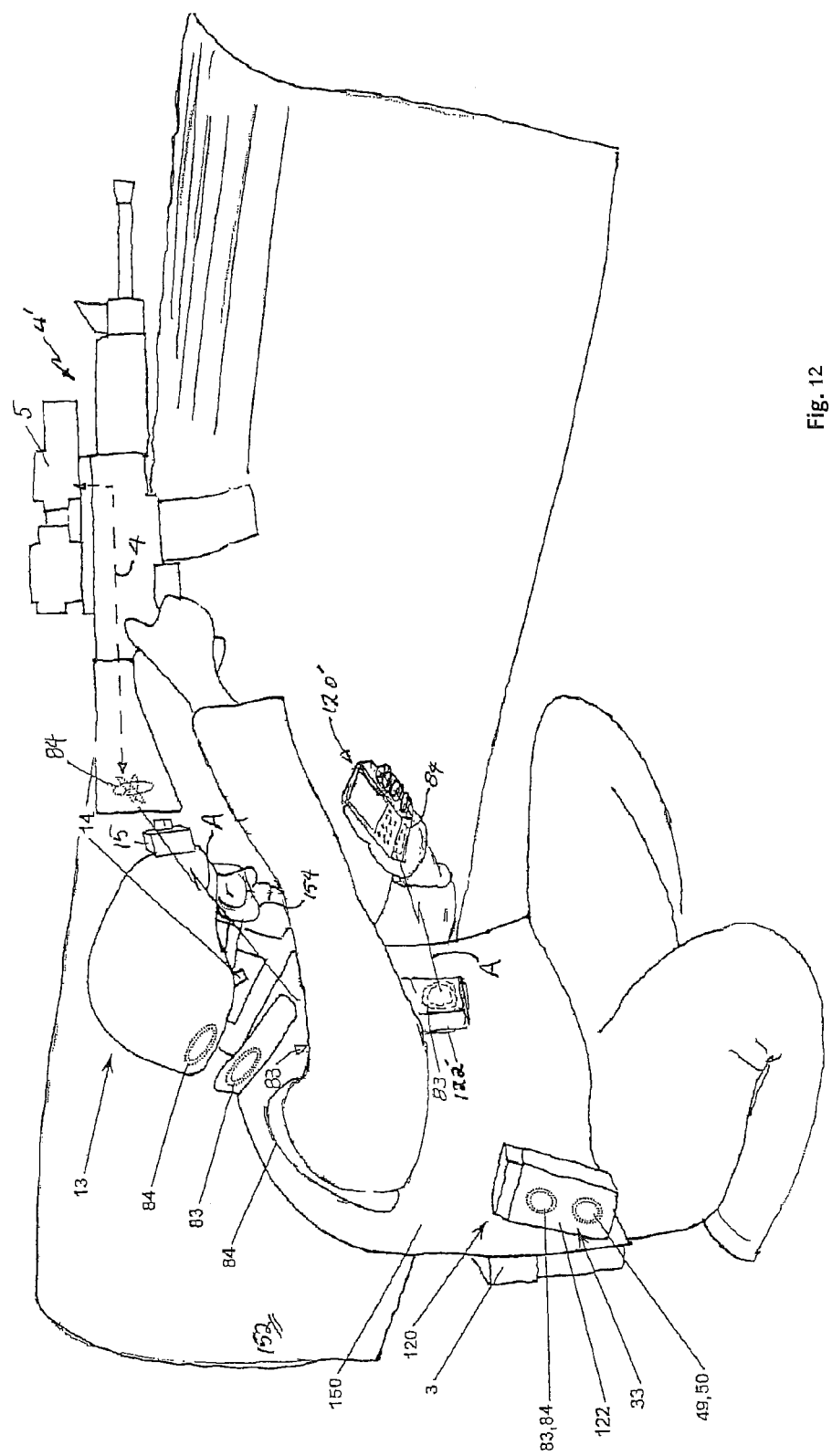
FIG. 12 is, in perspective view, the soldier of FIG. 11 in a crouched position taking cover behind a wall and using the inductive data coupling between the weapon sighting subsystem and the inductive data coupling between a hand held device such as a personal digital assistant, radio, or the like to view through the weapon sighting subsystem, to communicate from, or to take, transmit or stream still or video images from the weapon sighting subsystem or the hand held device or a helmet mounted sub-system, etc.

Further yet, consider a soldier's mission where the soldier is in a volatile and dangerous environment. It may be raining, and so the ground may be muddy. The soldier may be conducting a recon of a small village in a hostile area. As seen in FIG. 12, the soldier has taken cover behind a low wall. He waits in a crouched or kneeling position in the mud. In this hypothetical, the soldier can just see where men (not shown) are standing around an object (not shown) on the ground. He cannot make out what the object is, as it is over 100 m away.

The soldier is equipped with a soldier system which includes the improvements according to aspects of the present invention. He pulls up his weapon 4' so he can look through the weapon's sighting sub-system 5. An indicator (not shown) shows he still has a strong inductive data link. He sights the target through the sighting sub-system, which acts as a telescopic lens. He can now tell that the object on the ground is an IED. With the push of a button on the weapon 4', the image, GPS location and distance to target may be relayed by the soldier to forward command. The soldier may also pull out his tactical personal digital assistant (PDA) 120' and takes a photo of the men and IED and may enter some text. The soldier then may pass the PDA to another soldier who has a view from a different angle, who may then also take a photo, and also enter some text. In this hypothetical, while passing back the PDA, the PDA is dropped in the mud. Once the PDA is picked up by the first soldier, soldier checks and sees that the inductive data link was broken when he handed off the PDA. The soldier then touches the PDA to the PDA's pocket 122 and quickly pairs and reconnects to his soldier system. He enters one last text string and sends the message via the soldier system to forward command while he places the PDA back in its pocket. The soldier observes that the men are leaving with the IED. The soldier starts to receive a downlink from a repositioned drone, which will track the men and the IED from a comfortable distance.

Using prior art cable connections most if not all of this, albeit fictional, hypothetical scenario would not have been possible for two reasons. In applicant's experience, the umbilicals in the prior art are too short to allow use of some devices, without a loss of connections, when lying or squatting. For example, in the above scenario, the soldier likely could not have pulled his weapon up so he could look through the scope because the sight's data umbilical would have caught under the front of his load carriage vest. If he pulled hard, the breakaway connector would part as he moved his rifle into position to sight the target. Without the cable connected he could not relay the daytime video image. When he tried to pull his tactical PDA out, so that he could take a photo and send it with text to alert forward command, the data cable to the PDA (which may only be about 30 cm long) would be about 30 cm too short and he wouldn't have been able to get the PDA to the wall without moving up and likely being seen. When the PDA was handed off and fell into the mud, the PDA's connector port would have become plugged with mud, rendering it temporarily inoperable.

Figures 9A, 9B:
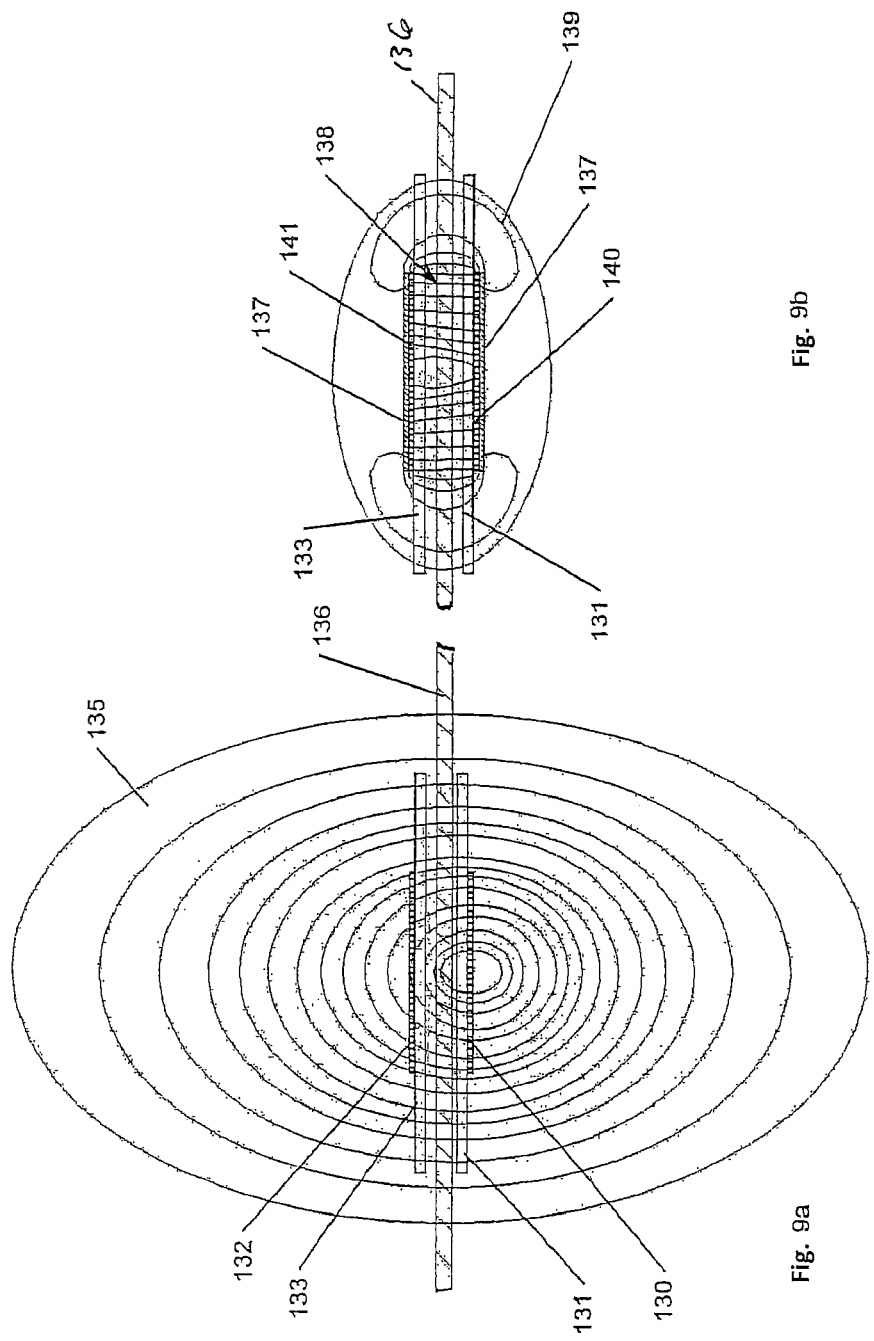
FIG. 9a illustrates the coils of FIG. 8a brought into closer proximity on opposite sides of a piece of non-conductive, non-magnetic material showing how, because of the closer proximity, the upper, secondary coil intercepts a greater amount of the magnetic flux from the lower primary coil even though the magnetic flux is symmetrical.
FIG. 9b illustrates the coils and their proximity of FIG. 9a wherein the coils each have a thin ferrite backing, and wherein the magnetic flux is illustrated to show that in close proximity, the increasingly directional flux results in a very high level of magnetic coupling between the primary and secondary coils as would be the case when a hand held device having a secondary coil is inserted into a pocket insert having a primary coil and aligned so as to be substantially coaxial.
Figure 11:
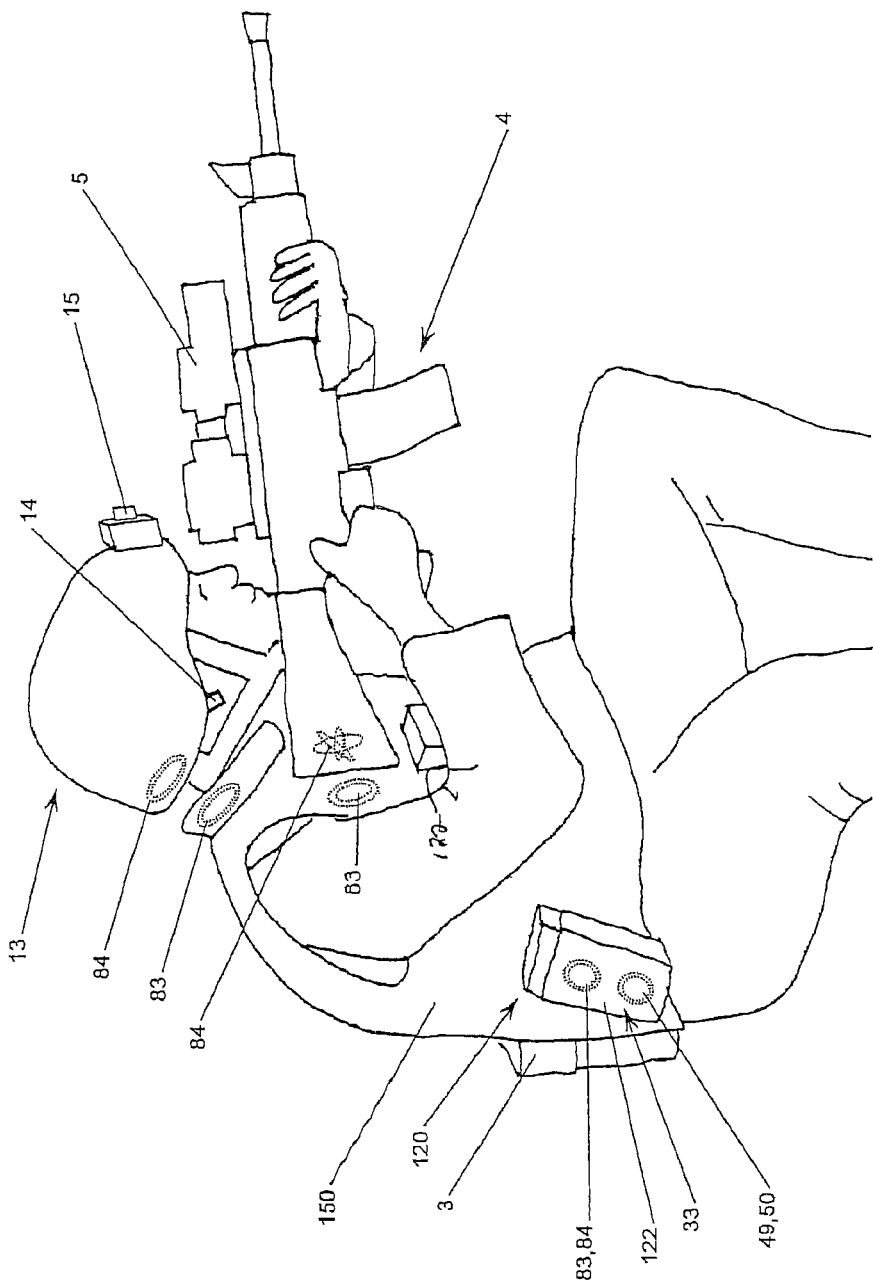
FIG. 11 is, in perspective view, a representation of a solider wearing a soldier system which includes a load carriage vest having a central or main battery, and pockets with inductive data and inductive power transfer, and also showing inductive data transfer to a helmet subsystem and weapons subsystem.

When an independent device 120 (such as a PDA, radio or GPS etc.) is closely docked, that is when each handheld device 120 is placed and docked within its own pocket 122 or other docking station so as to inductively couple the primary coils (83,49) in the pocket with the secondary coils (84,50) on the device, due to the close proximity of the primary and secondary coil structures of the inductive data circuits as represented in FIG. 9b the magnetic flux will be substantially fully contained between the device and its corresponding pocket. In FIGS. 8a and 9a an air backed primary inductive coil 130 is shown parallel to an air backed secondary inductive coil 132 are mounted on, respectively, non-magnetic non-conductive enclosures 131,133, on opposite sides of a section of non-magnetic non-conductive material 136. The primary coil generates a symmetric magnetic flux 135. In FIGS. 8b and 9b, the primary and secondary coils each have a ferrite backing 137. When the coils are only loosely coupled such as in FIG. 8b, the magnetic flux lines become concentrated as represented by concentrated flux lines 138 having stray flux 139 not contained by ferrite backings 137. When the coils are closely coupled such as in FIG. 9b, the ferrite backed primary coil 140 and ferrite backed secondary coil 141 generate highly concentrated flux, again as represented by concentrated flux lines 138 having much reduced stray flux 139.

Close coupling of the coils, by for example the use of devices 120 mounted in pockets 122 provides three benefits. The first is that as the coils will be highly coupled data transmission rates can be very high. The second is that as the majority of the magnetic flux is contained within the coil structures there is very little stray magnetic flux, allowing two pocket-docked devices, each enabled with inductive data transfer capability to be placed adjacent to each other without interfering with each other. The third benefit is that the data coupling will inherently be secure with a high level of security against eavesdropping as the magnetic flux is essentially contained with no interceptable emission.

The need may arise where for example a central data processor may require pairing and transmit and receive data from two remote devices. In this instance anti collision data processing would be required.

The hand-held devices that are provided with inductive data communication may include, but are not intended to be limited too, any hand held device placed within a pocket permanently attached to apparel, between a data device and a modular pocket (that is, a pocket that can be attached to any location on a garment), between a central data processing module that interfaces with a CPU, between the collar or shoulder and devices mounted on a helmet, between a wrist strap and attachable/detachable devices, between a weapons sub-system and the torso and directly between two discrete devices. Each pocket may be permanently or modularly affixed to a piece of apparel such as pants, jacket, shirt, jacket, load carriage vest, ballistic protective vest, biological chemical warfare garment etc. The primary data circuit may be located on the inside of the garment, that is not within the pocket, or it may be located within a fabricated insert such as insert 33, that has been placed inside the pocket or it may be a removable circuit that is potted, placed within a plastic enclosure or otherwise protected mechanically and environmentally. In either instance, the device to which data communication is to be established and maintained is placed within the pocket, meeting the close proximity requirements required to establish near field communications. Once docked and paired the device can be removed from the pocket and held at a distance for example up to 1 m or typically an arms length from the torso.

Pocket insert 33, as seen by way of example in FIGS. 10a and 10b may be of a non conductive, non magnetic material 131, for example of plastic, glass or carbon fibre structure etc, which is form fitting to both the inside dimensions of pocket 122 and the device 120 placed (in direction B) within it. The side of device 120 which contains the secondary inductive data circuit 87a and coil 84 may be placed into the pocket insert 33 against the side of the insert 33 which contains the primary inductive data circuit 123 and coil 83. To ensure the device 120 is held securely adjacent to the insert 33, the insert 33 may contact the device 120 on a further second, third or fourth side of the device, for example, the back, bottom and front or in another instance the front, back and each side of the device. The pocket insert provides both alignment of the primary and secondary coils 83,84 when the device is stowed and further mechanical protection to the device. In the case of 2D antennas or coils, an optimal design would allow both the primary and secondary data coils to be co-axially aligned when the device is placed within the pocket insert. The insert may also contain a primary inductive power circuit 125 and associated primary coils 49 with which to provide wireless inductive power to a secondary coil 50 and associated battery charging circuits within the device. The device 120, encased in insert 33, may collectively be stowed (direction C) in pocket 122.

In another iteration, the pocket which could be made from fabric, formed foam or other materials has fabricated within it a sleeve or inner pocket within which the primary circuit could be placed. The primary circuit would be encased in a potting compound, plastic or other material enclosure that is non conductive and non magnetic and would be placed within the pocket sleeve. This would also ensure positive alignment of the primary and secondary data circuit to allow an initial handshake or pairing to be performed.

The modular pocket is very similar to the fixed pocket however with a modular pocket the primary data circuit is located within the pocket using only an insert or sleeve within the pocket, as the primary circuit will now move with the pocket if it is relocated on the vest or apparel.

Another location a device may be attached to a person is on the wrist. A power and data conductor may be run down the arm to a wrist strap docking station that holds a removable device such as a GPS, PDA or multi-purpose device. Primary inductive power and data circuit are located within the strap, the primary wrist strap inductive data circuit pairs with the secondary inductive data circuit within the device when it is docked to the wrist strap. Once the device is paired, data will continue to be transferred to the device when it is undocked from the wrist and is handheld. An iteration of the wrist mounted primary circuit could be a power and data circuit mounted within the sleeve cuff of a garment or apparel. The cuff must only be proximal to the wrist mounted device to pair and can then exchange data either in this position or if removed and is handheld.

A further application is to transfer data between a user and a weapons sub-system. The weapon for example the weapon 4' of FIG. 12, upon which may be mounted various thermal, video and other sensors requiring data exchange may have a secondary inductive data coil and circuit 84 mounted within or on the butt of the weapon. The primary circuit 83 may be located in the shoulder, hip or other suitable location. When the weapon is for example, initially brought to the shoulder or placed into its carry position across the front of the soldier's torso, the inductive data circuit 83 and inductive data circuit 84 would pair, then allow the continued exchange of data as the weapon is brought away from the shoulder or carry position, for example as seen in FIG. 12. A further option would be for two devices to directly pair, for example, for the weapons video, thermal or infra-red imaging sub-system to pair directly with a video display on the helmet or other heads-up-display. All of these implementations and many others would allow the removal of the umbilical or tethered connection between the soldier and the weapon or hand-held device and reduce snagging, unintentional disconnects and other associated nuisance problems experienced with a modern weapon sub-system.

Another application would be the transfer of data between a soldier and electronic devices worn on the soldier's head directly or devices worn upon a helmet. The primary data transfer circuit could be located for example on the garment on the upper chest, on either shoulder or both shoulders, the upper back or within a collar, shoulder pad or other fabricated element that was permanently attached to or removable from the garment. The secondary data coil and circuitry may then be located on either the inside or outside of the helmet on either a planar surface or an edge such as the brim. The secondary circuit could be either attached semi-permanently with fasteners such as screws, bolts, adhesive or be attached to allow its easy removal using hook and loop tape, elastic, webbing, chin strap or be attached to a helmet cover or the such.

A further embodiment may be the inductive transfer of data between two garments, for example an undergarment layered adjacent an over-garment, such as a load carriage vest placed over a ballistic protective vest. The data circuits need not necessarily be co-located however to maintain high data rates and continuous data transfer without interruption from anti-collision processes they should be located proximally. For low profile requirements the coils can be as simple as two thin air coils printed on Mylar which would be compliant and comfortable.

Another garment embodiment would permit passing data between separate front and back garment components on a sectioned piece of apparel which may provide for rapid doffing of the sections, for example front and back sections from the soldier. An example of this would be a protective tactical vest with discrete front and back components that are designed to be either adjustable or fall apart from one another at the waist and shoulder in an emergency. While being worn, the separate sections may using the present inductive coupling still transfer between them power and/or data. With limited space available on a vest for all the load a soldier is required to carry, both the front and back surfaces of the vest become populated with electronics. Although the front and back of a soldier system can be designed to each have their own central power source, invariably data devices on the front and back will require data exchange or communication capability across the separation between the front and back garment parts. As with data connectivity between two garments, the primary and secondary data circuits and coils need not necessarily be coaxially located however to maintain high data rates and continuous data transfer without interruption from anti-collision processes they should be located proximally that is adjacent to each other. For low profile requirements the coils can be as simple as two thin air coils printed on Mylar which would again be compliant and comfortable.

When a soldier is wearing a biological chemical warfare protective garment in a life threatening environment the soldier would be able to pass both power and data inductively through the protective garment. This would allow the transmission of data through the protective fabric without introducing openings or vias in the garment that may be then become susceptible to penetration by chemical biological warfare agents.

A requirement for inductive data transfer would likely be that it not interfere with conventional military or civilian radio transmitters and receivers. Again because the inductive coupling according to the present invention is operating in the electro-magnetic frequency spectrum it would not cause interference with devices operating in RF spectrum. Due to the fact that inductive coupling uses the electro-magnetic spectrum it does not interfere with RF communications, nor can it be jammed by RF. Therefore, when in an RF denied area whether to prevent the triggering of IED or otherwise, inductive power and especially inductive communications and data transmission would be unaffected.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An inductively coupled power and data transmission system for a soldier system comprising:
   a main power source adapted for portable wearing by a soldier,
   apparel having an electrical conductor mounted therein in electrical communication with said main power source, said apparel having a first inductively couplable power and data transmission sub-system including at least one electrically conductive primary coil electrically connected to said main power source by said electrical conductor, and further including a primary processor and a primary transmitter/receiver sub-system cooperating between said main power source and said at least one primary coil so as to regulate power to said at least one primary coil and transmission of power and data by said at least one primary coil and reception of data by said at least one primary coil,
   an independent device having a second inductively couplable power and data transmission sub-system including at least one electrically conductive secondary coil, a secondary battery, a secondary processor, and a secondary transmitter/receiver sub-system, wherein said at least one secondary coil is electrically connected to said secondary battery and wherein said secondary processor and said secondary transmitter/receiver sub-system cooperate between said secondary battery and said at least one secondary coil so as to regulate reception of power and data by said at least one secondary coil
   said at least one electrically conductive first and second primary coils adapted to transfer said power and data during inductive coupling at electromagnetic radiation frequencies from said at least one electrically conductive first primary coil to said at least one electrically conductive secondary coil,
   wherein, said inductive power is transferred when said inductive power coupling is closely adjacent inductive power coupling wherein said at least one primary power coil and at least one secondary power coils are closely adjacent to each other, and wherein a data link for said transfer of said data is established when said at least one primary data coil and secondary data coils are said closely adjacent inductively coupled, and wherein said data is transferred between said at least one primary and secondary data coils when said inductive data coupling is between said closely adjacent inductive coupling and near inductive coupling, wherein said near inductive coupling is constrained by factors including the wavelength, lambda, of electromagnetic radiation in said inductive coupling when said wavelength is used in the formula lambda/(2×pi) to determine an outer range limit of said near inductive data coupling, as attenuated by attenuation of said radiation and power levels of said power transfer.

2. The system of claim 1 wherein said at least one primary coil is mounted on said apparel in positions chosen from the group including: torso, collar, shoulder, wrist, helmet front surface; and wherein said at least one secondary coil is mounted on said independent device so as to optimize said closely adjacent inductive coupling and said near inductive coupling of said at least one secondary coil to said at least one primary coil when in said position.

3. The system of claim 2 wherein said at least one primary coil and said at least one secondary coil each include a pair of coils, one of which of said coils of said pair of coils adapted for said transfer of said power and the other of which of said coils of said pair of coils adapted for said transfer of said data.

4. The system of claim 3 wherein said range limit of said near inductive data coupling is substantially one meter.

5. The system of claim 3 wherein said coil of said pair of coils for said transfer of said data is a data transfer coil and wherein said coil of said pair of coils for said transfer of said power is a power transfer coil, and wherein said primary processor is adapted to: (a) shut-off said power from said main power source to said at least one primary coil when said data transfer indicates that said secondary battery is charged or said at least one secondary coil is not in position for said closely adjacent inductive coupling, and, (b) continuously continue said transfer of said data between said at least one primary and secondary coils until said range limit of said near inductive coupling is exceeded and said near inductive coupling terminated, and, (c) automatically re-establish said inductive coupling between any one of said at least one primary coil and a corresponding secondary coil of said at least one secondary coil upon detection of a corresponding said closely adjacent inductive coupling between the two.

6. The system of claim 5 wherein said at least one primary coil is a plurality of primary coils distributed about said apparel and wherein said at least one secondary coil is a plurality of secondary coils on a corresponding number of said independent devices, wherein said independent devices are adapted to dock for said closely adjacent inductive coupling with corresponding said primary coils.

7. The system of claim 6 wherein said closely adjacent inductive coupling for said docking of said independent devices include docking in pockets on said apparel, wherein at least one primary coil of said plurality of primary coils is mounted in said pocket.

8. The system of claim 6 wherein said independent devices are chosen from the group of categories comprising: torso sub-systems, helmet sub-systems, weapon sub-systems.

9. The system of claim 8 wherein said main power source is a rechargeable main battery.

10. The system of claim 1 wherein said range limit of said near inductive data coupling is substantially one meter.

11. The system of claim 1 wherein said close inductive power coupling is substantially in the range of approximately 0-3 centimeters.

12. The system of claim 1 wherein said primary processor is adapted to: (a) shut-off said power from said main power source to said at least one primary coil when said data transfer indicates that said secondary battery is charged or said at least one secondary coil is not in position for said closely adjacent inductive coupling, or said transfer of said data is to take place on the same coil as said transfer of said power, and, (b) continue said transfer of said data between said at least one primary and secondary coils until said transfer of power is to take place on the same coil, or until said range limit of said near inductive coupling is exceeded and said near inductive coupling terminated, and, (c) automatically re-establish said inductive coupling between any one of said at least one primary coil and a corresponding secondary coil of said at least one secondary coil upon detection of a corresponding said closely adjacent inductive coupling between the two.

13. The system of claim 1 wherein said at least one primary coil is a plurality of primary coils distributed about said apparel and wherein said at least one secondary coil is a plurality of secondary coils on a corresponding number of said independent devices, wherein said independent devices are adapted to dock for said closely adjacent inductive coupling with corresponding said primary coils.

14. The system of claim 13 wherein said closely adjacent inductive coupling for said docking of said independent devices include docking in pockets on said apparel, wherein at least one primary coil of said plurality of primary coils is mounted in said pocket.

15. The system of claim 14 wherein said pockets are modular and selectively removable from said apparel.

16. The system of claim 14 wherein said pockets further include inserts, and wherein at least one of said primary coils is mounted on each said insert.

17. The system of claim 13 wherein said independent devices are chosen from the group of categories comprising: torso sub-systems, helmet sub-systems, weapon sub-systems.

18. The system of claim 17 wherein said main power source is a rechargeable main battery.

19. The system of claim 17 wherein said transfer of said data includes a networked transfer of said data between a plurality of said independent devices.

20. The system of claim 17 wherein said transfer of said data includes a networked transfer of said data between a plurality of said independent devices.

21. The system of claim 1 wherein said first and second inductively couplable power and data transmission sub-systems are reversible so that, alternatively, said first inductively couplable power and data transmission sub-system is mounted in said independent device and said second inductively couplable power and data transmission sub-system is mounted in said apparel.

22. The system of claim 1 wherein said apparel is a first piece of apparel and wherein said independent device is a second piece of apparel.

23. The system of claim 22 wherein said second piece of apparel is layered adjacent said first piece of apparel.

24. The system of claim 22 wherein said first piece of apparel is a first section of a sectioned piece of apparel, and wherein said second piece of apparel is a second section of said sectioned piece of apparel such that said sectioned piece of apparel when worn by the soldier provides said transfer of said power and said data between said sections, and wherein said sections are selectively detachable from one another for doffing said sectioned piece of apparel.

* * * * *